United States Patent [19]

Morita

[11] Patent Number: 5,209,511

[45] Date of Patent: May 11, 1993

[54] AIR BAG FOR A PASSENGER'S SEAT

[75] Inventor: Kazuo Morita, Shiga, Japan

[73] Assignee: Takata Corporation, Tokyo, Japan

[21] Appl. No.: 788,608

[22] Filed: Nov. 6, 1991

[30] Foreign Application Priority Data

Nov. 30, 1990 [JP] Japan .................. 2-334591

[51] Int. Cl.$^5$ .......................................... B60R 21/16
[52] U.S. Cl. ...................... 280/743; 383/33; 220/404; 248/99
[58] Field of Search ............. 280/728, 743, 732; 383/33; 220/404; 248/99

[56] References Cited

U.S. PATENT DOCUMENTS

| | | | |
|---|---|---|---|
| 3,807,754 | 4/1974 | Rodenbach et al. | 280/743 |
| 3,879,056 | 4/1975 | Kawashima et al. | 280/743 |
| 4,842,300 | 6/1989 | Zomek | 280/732 |
| 5,046,759 | 9/1991 | Enniss et al. | 280/743 |
| 5,060,972 | 10/1991 | Satoh et al. | 280/743 |
| 5,064,218 | 11/1991 | Hartmeyer | 280/743 |
| 5,071,161 | 12/1991 | Mahon et al. | 280/743 |
| 5,100,168 | 3/1992 | Horiuchi et al. | 280/728 |

FOREIGN PATENT DOCUMENTS

| | | | |
|---|---|---|---|
| 0364267 | 4/1990 | European Pat. Off. | 280/728 |
| 2552815 | 5/1977 | Fed. Rep. of Germany | 280/743 |
| 2335373 | 7/1977 | France . | |
| 133266 | 5/1990 | Japan | 280/728 |
| 1531069 | 11/1978 | United Kingdom . | |

Primary Examiner—Karin L. Tyson
Attorney, Agent, or Firm—Kanesaka and Takeuchi

[57] ABSTRACT

A passenger's air bag includes an inlet port to receive gases. Synthetic resin is attached to the edge of the inlet port to provide a plate-like edge. An air bag has a rectangular inlet port. A plurality of fabrics is joined together by stitching and connected to the edge of the inlet port. Synthetic resin is attached to the edge of the inlet port to provide a plate-like edge. An air bag system for a passenger's seat comprises a housing having a rectangular opening, an air bag stored in a folded condition in the housing and inflated through the opening of the housing, a modular cover adapted to close the opening of the housing and torn or bent to permit deployment of the air bag and an inflator actuated to generate gases to inflate the air bag. The edge of the inlet port of the air bag is attached to the opening of the housing.

2 Claims, 6 Drawing Sheets

AIR BAG FOR A PASSENGER'S SEAT

FIELD OF THE INVENTION

The present invention relates to an air bag system for a passenger's seat and an air bag inflatable to protect an occupant in the event of a vehicle collision.

DESCRIPTION OF THE RELATED ART

An air bag system of this type includes a housing (i.e., container) within which an air bag and an inflator are mounted. A modular cover is attached to cover the air bag. Upon collision of a vehicle, the inflator is actuated to deploy the air bag. The modular cover is then opened in a vehicle compartment to permit deployment of the air bag to protect a vehicle occupant.

The modular cover has preweakened (tear) or rupture lines. This permits rupture or bending of the modular cover along the preweakened or rupture lines when the inflator is actuated to deploy the air bag.

In such a conventional air bag system, the air bag has openings to receive securing means such as rivets, screws or bolts. The container also includes openings to receive the securing means. In assembly, the openings of the air bag are aligned with the openings of the container. Bolts, screws or rivets are thereafter inserted into these openings. However, it is not easy to align the openings of the air bag with the openings of the container since the air bag is made of fabric. Specifically, the edge of the air bag made of fabric tends to extend through the openings of the container. This deteriorates assembly of the conventional air bag system.

OBJECT AND SUMMARY OF THE INVENTION

It is an object of the present invention to provide an air bag system for a passenger's seat and an air bag used therefore, which includes an reinforced inlet port to firmly mount the air bag.

Another object of the present invention is to provide an air bag system wherein an air bag can easily be mounted to a container or housing to increase the production rate.

According to one aspect of the present invention, there is provided a passenger's air bag comprising an inlet port, wherein synthetic resin is attached to the edge of the inlet port to provide a plate-like edge.

According to another aspect of the present invention, there is provided a passenger's air bag which comprises a rectangular inlet port, and a plurality of fabrics joined together by stitching, wherein the fabrics terminate at the edge of the inlet port, and wherein synthetic resin is attached to the edge of the inlet port to form a plate-like edge.

Preferably, the inlet port is rectangular. The air bag has a peripheral surface and plane lateral sides and is inflated to a barrel configuration. The rectangular inlet port includes long sides and short sides. The long sides and the short sides of the inlet port are connected to the peripheral surface and the lateral sides of the air bag, respectively.

The synthetic resin is impregnated into the edge of the air bag.

The synthetic resin is injection moulded to have a plate-like configuration and attached to the fabrics or air bag to form a plate-like edge.

Preferably, a reinforcing element is embedded in the plate made of synthetic resin.

The plate made of synthetic resin has projections adapted to mount the passenger's air bag to a container of an air bag system.

The plate made of synthetic resin has bolts adapted to mount the passenger's air bag to a container of an air bag system.

The plates are attached to the outer and back sides of the edge of the air bag. The synthetic resin may be injection moulded into through holes of the fabrics to provide an integral plate.

The present invention provides an air bag system for a passenger seat comprising a housing including an opening, an air bag stored in a folded condition in the housing to be deployed through the opening of the housing, a modular cover adapted to cover the opening of the housing to be torn or bent to permit deployment of the air bag, and an inflator actuated to generate gases to inflate the air bag, wherein the edge of an inlet port is attached to the opening of the housing.

With the air bag of the present invention, synthetic resin is attached to the edge of the inlet port of the air bag to provide a plate-like edge. The air bag is made of fabric, but the edge of the inlet port has a rigidity as such. This prevents the air bag to extend into the openings of the container through which securing means pass and thus, enables quick assembly of the air bag system.

Also, in the passenger's air bag of the present invention, the edge of the inlet port of the air bag is reinforced by synthetic resin. Thus, pins, bolts, or screws can be inserted through the edge of the air bag to assure mounting of the air bag.

Synthetic resin is injection moulded to or impregnated into this edge.

A reinforcing member may be embedded in the synthetic resin to reinforce the edge of the inlet port of the air bag.

The plate member made of synthetic resin includes projections or bolts to prevent removal of the edge of the air bag when the air bag is deployed and to facilitate mounting of the air bag.

A pair of plate members may be attached to outer and back sides of the edge of the inlet port and may be integrated together by injection moulding synthetic resin into through holes of the air bag so as to enhance connection between the plates and the air bag made of fabric.

The air bag system of the present invention can easily be assembled, and the air bag is firmly mounted to the air bag system.

BRIEF DESCRIPTION OF THE DRAWINGS

For a better understanding of the present invention, reference may be made to the following description of preferred embodiments when taken in conjunction with the accompanying drawings, in which.

PREFERRED EMBODIMENT

The present invention will now be described by way of example with reference to the drawings.

Figure 1:
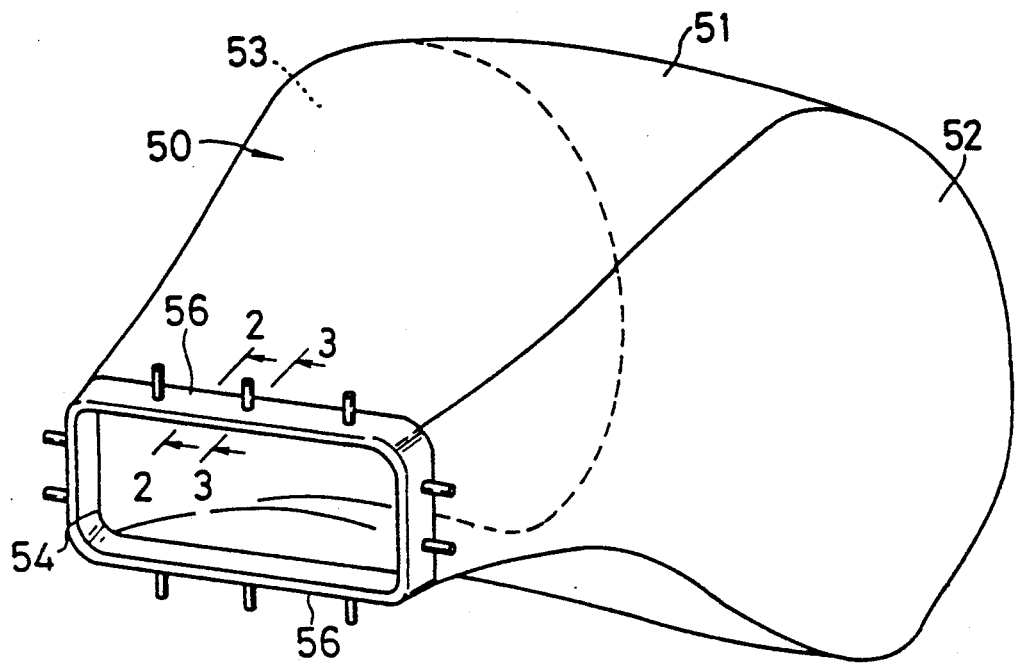
FIG. 1 is a perspective view of one embodiment of an air bag in an inflated condition.
Figure 2:
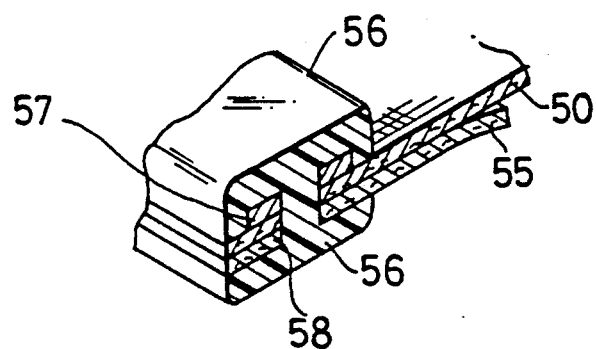
FIG. 2 is a sectional view taken on the line 2—2 of FIG. 1.
Figure 3:
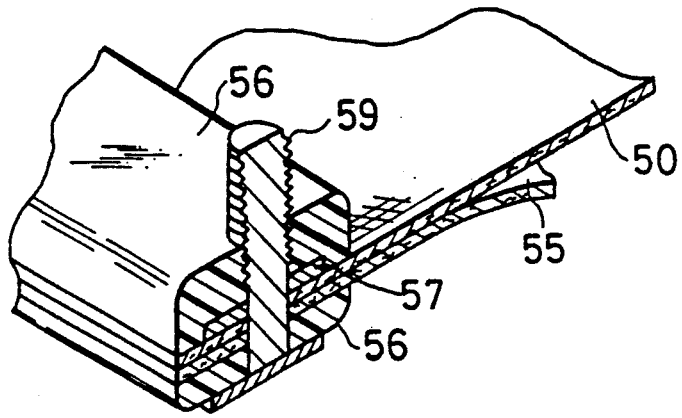
FIG. 3 is a sectional view taken on the line 3—3 of FIG. 1.

FIG. 1 is a perspective view of an air bag in an inflated condition. FIGS. 2 and 3 are sectional views taken on the line 2—2 and line 3—3 of FIG. 1, respectively.

The air bag is inflated to a barrel configuration and includes a peripheral fabric 51, and opposite side fabrics 52 and 53 stitched into the peripheral fabric 51.

In this embodiment, the air bag 50 has an inlet port 54. An annular reinforcing fabric 55 is attached to the edge of the inlet port 54.

A pair of thin sheets 56, made of synthetic resin, is moulded and cured to opposite sides of the air bag. An iron plate 57 as a reinforcing element is embedded in the sheet 56.

Figure 4:
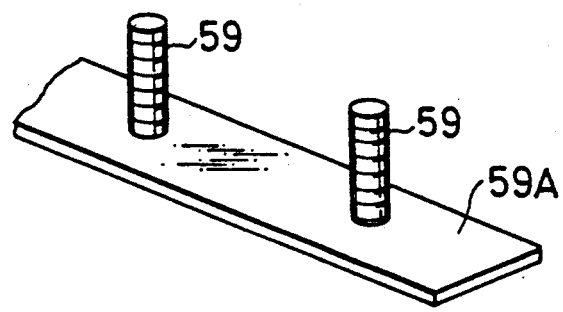
FIG. 4 is a perspective view of bolts.

The air bag 50, the reinforcing fabric 55 and the iron plate 57 all have through holes 58 into which synthetic resin is injection moulded to integrally form a pair of sheets 56 with the air bag 50 sandwiched therebetween. Stud bolts 59 extend into the sheets 56. As shown in FIG. 4, the stud bolts 59 extend upright in a common base plate 59A.

The inlet port 54 of the air bag 50 with the sheets 56 is secured to a container or subcontainer of the air bag system by the bolts 59.

The edge of the inlet port 54 of the air bag 50 is reinforced by synthetic resin to provide high rigidity. Thus, the bolts 59 can easily be inserted into holes formed in the container or subcontainer to assemble the air bag 50.

In such air bag, the sheets 56 are moulded to the air bag 50 to reinforce the edge of the inlet port 54. Also, forces exerted on the edge of the air bag to remove the air bag from the system can uniformly be dispersed. This prevents removal or damage of the air bag.

As is clear from FIGS. 1 and 2, no blind rivet is employed in this embodiment. This eliminates riveting operation, increases the production rate, and reduces the cost of rivets.

Figure 5A:
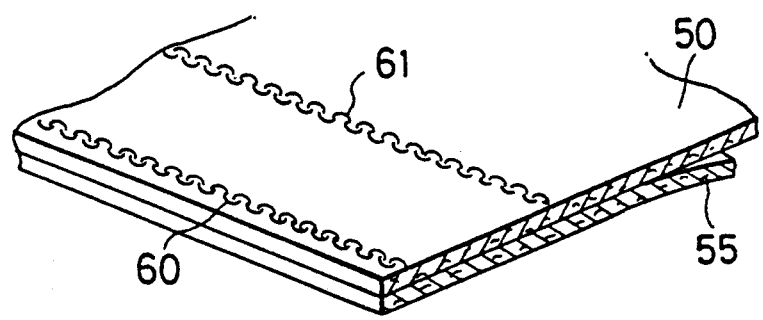
FIG. 5(a) and FIG. 5(b) are sectional views showing the principal parts of modified air bags.

In the air bag shown in FIGS. 1 to 4, the reinforcing fabric may be stitched into the air bag 50 as shown in FIG. 5(a). The reference numerals 60 and 61 indicate lines of stitching.

These lines of stitching 60 and 61 project from the fabric and thus, extend into the sheet 56 as injection moulded to the air bag. When the air bag is inflated, the lines of stitching 60 and 61 resist or overcome the resultant sheer stress which may be exerted between the sheets 56 and the fabric in a direction parallel to the surface of the fabric. This arrangement thus strongly joins the sheets 56 and the air bag 50 or the reinforcing fabric 55 together.

In FIG. 5(a), the reinforcing fabric 55 is used. As an alternative, the reinforcing fabric 55 may not be used, and the air bag may have only the lines of stitching 60 and 61. Also, the air bag may have a single line of stitching or two or more lines of stitching.

Figure 5B:
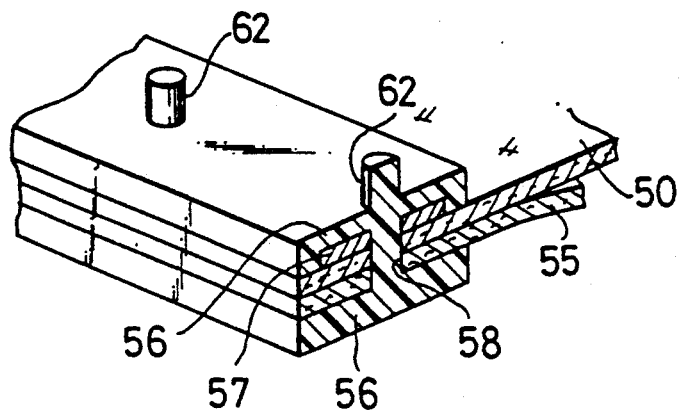

As shown in FIG. 5(b), the air bag may have a plurality of projections 62. These projections 62 are engaged with the holes of the container or subcontainer to more firmly mount the air bag.

Figure 6:
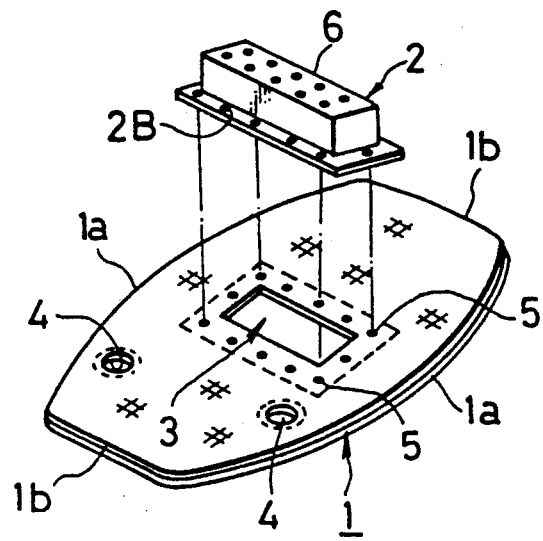
FIG. 6 is a perspective view of a modified air bag.
Figure 7:
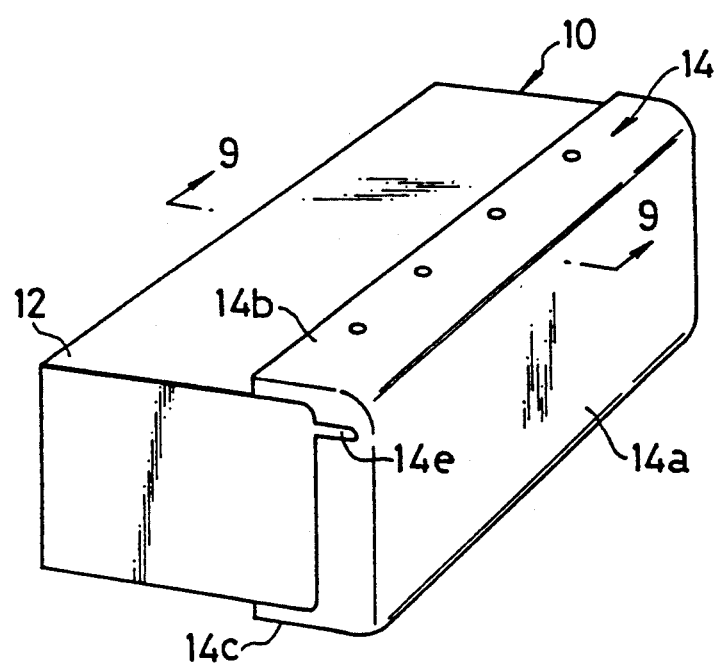
FIG. 7 is a perspective view of an air bag system.

FIG. 6 is a perspective view of a modified air bag and a subcontainer 2. An air bag 1 has straight short sides 1b and arcuate long sides 1a. An inlet port 3 is formed centrally in one side of the air bag remote from a vehicle occupant to receive gases from an inflator. A plurality of outlet ports 4 (vent holes) is formed in the air bag to absorb contact of the air bag with the occupant. The reference numeral 5 indicates a plurality of apertures through which rivets pass. Synthetic resin is impregnated into the edge of the air bag 1 as shown by a broken line so as to provide a plate-like edge of high rigidity The edge of the air bag has a plurality of apertures 5 through which rivets or bolts pass.

The subcontainer 2 has a flange 2A. The flange 2A has a plurality of apertures 2B aligned with the apertures 5 so as to receive rivets or bolts to mount the air bag 1 to the subcontainer 2.

A plurality of openings 6 is formed in the bottom of the subcontainer 2 to permit the passage of gases from the inflator.

This air bag 1 is incorporated in an air bag system 10 shown in FIGS. 7 to 10. Referring to FIGS. 7 to 10, a modular cover 14 is attached to the front of a container 12. A plurality of inflators 16 is fixedly mounted within the container 12. The subcontainer 2 is disposed in the container 12 to receive the air bag in a folded condition. Gases flow from the inflators 16 through the openings 6 into the air bag 1 to deploy the air bag 1.

The container 12 is in the form of a box. A frame 22 has a L-shaped section and is mounted to the inner peripheral edge of the open face. A flange 2A of the subcontainer 2 and the edge of the inlet port 3 of the air bag 1 are secured to the rear surface of the frame 22 by rivets 24.

A fabric material (masking cloth) 18b is attached to the front surface of the air bag 1 and located between the air bag 1 and the modular cover 14 to prevent direct contact of the air bag 1 with the modular cover 14.

Figure 8:
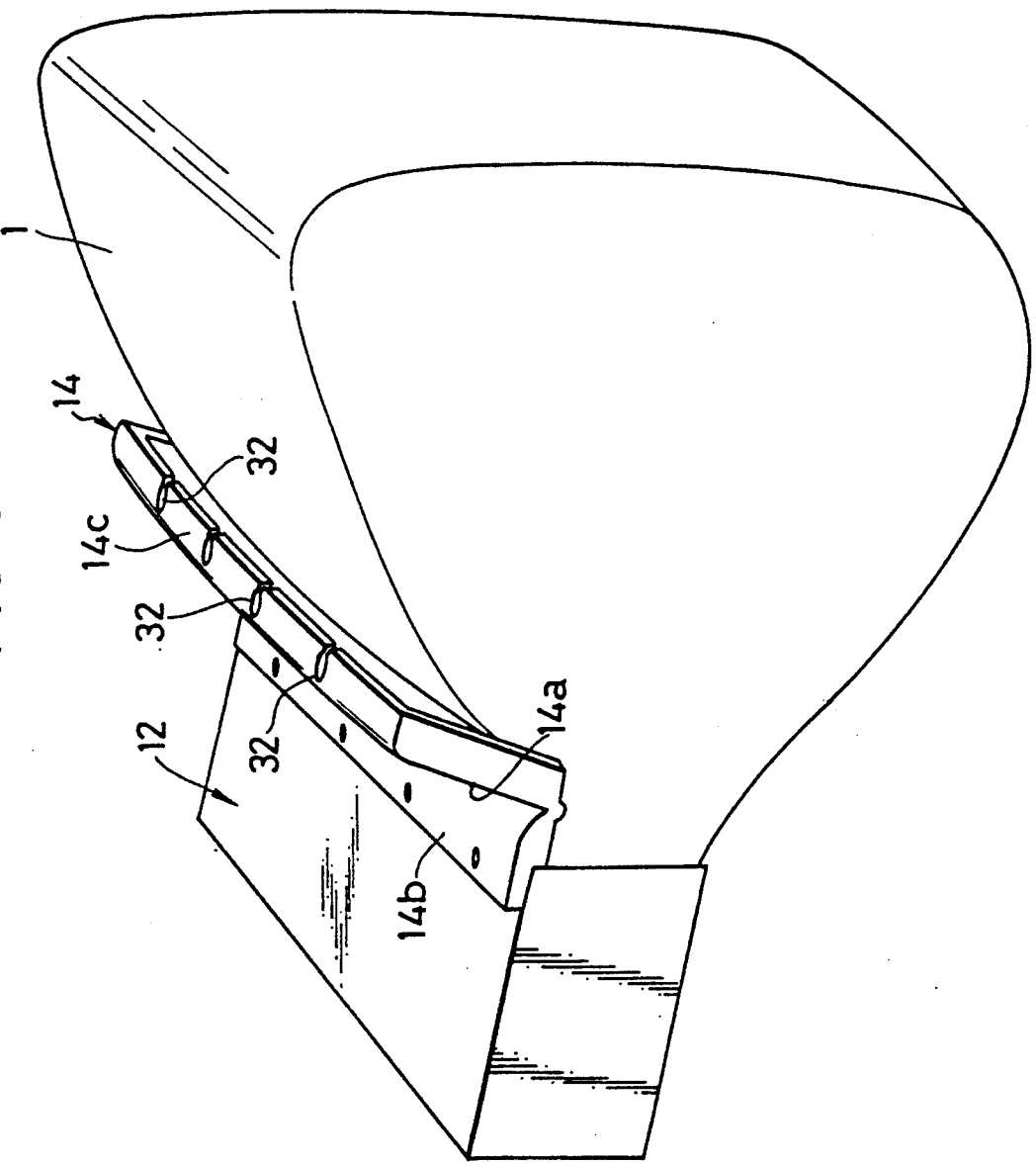
FIG. 8 is a perspective view of an air bag in an inflated condition.
Figure 9:
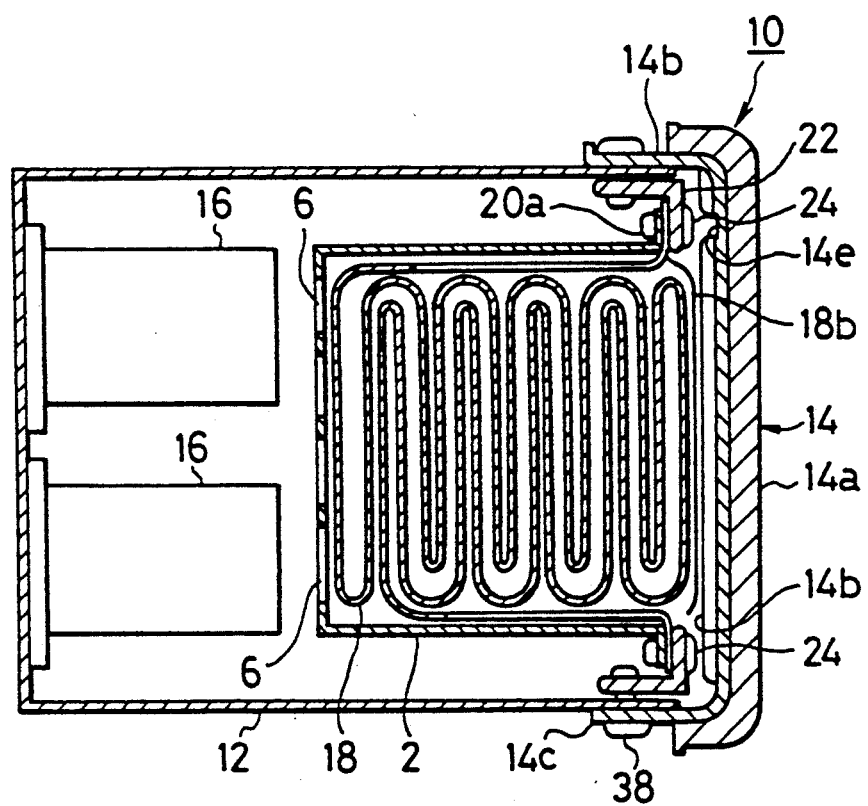
FIG. 9 is a sectional view taken on the line 9—9 of FIG. 7.
Figure 10:
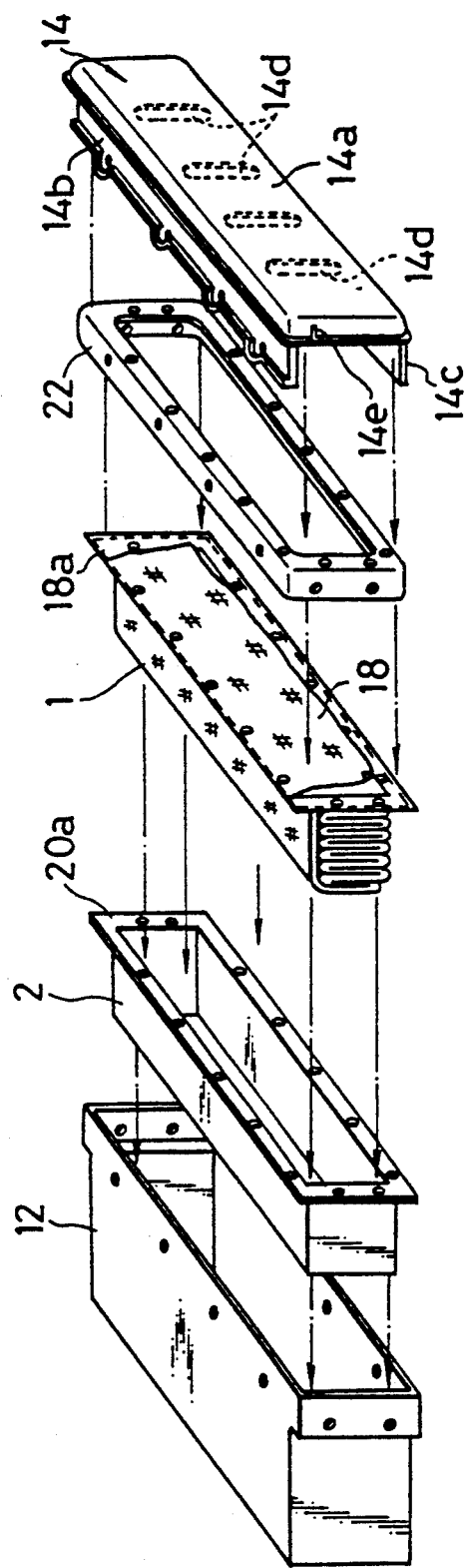
FIG. 10 is a disassembled view, in perspective, of the air bag system.

The modular cover 14 has a body 14a sized to cover the open face of the container 12, an upper flange 14b extending rearwardly from the upper side of the body 14a, and a lower flange 14c extending rearwardly from the lower side of the body 14a. A plurality of ribs 14d is formed on the rear surface of the body 14a. Also, a groove 14e is formed in the body 14a to facilitate opening of the body 14a. A plurality of elongated slits 32 is formed in the lower flange 14c of the modular cover 14. The lower flange 14d of the modular cover 14 is secured to the container 12 by means of rivets 38 passed through the elongated slits 32. The flange 14d is secured to the container 12 so that the slits 32 pass through the rivets 38 and the flange 14c is disengaged from the container 12 when the cover 14 is pushed by the inflating air bag 1. With the air bag system 10 thus constructed, the inflator 16 is actuated to inflate the air bag 1. This causes the lower half of the modular cover to move forwards As further pressure is applied from the air bag 1, the modular cover 14 is bent outwards along the groove 14e of the modular cover 14. Then, the air bag 1 is deployed in the vehicle compartment to protect an occupant as shown in FIG. 8.

In the illustrated embodiment, the modular cover 14 is bent along the groove 14e. It is to be understood that as the air bag inflates, the modular cover may rupture and is opened toward the occupant in the vehicle compartment.

In the foregoing embodiment, the air bag is stored in the subcontainer. Alternatively, the air bag may be directly stored in the container.

I claim:

1. A passenger's air bag, comprising:

a body made of fabric, said body having an inlet port with an edge portion, a plurality of openings around the edge portion, and inner and outer sides at the edge portion;

synthetic resin plates formed on the inner and outer sides of the edge portion to sandwich the body therebetween, said synthetic resin plates at the inner and outer sides being integrally molded and connected together through the openings of the body and being impregnated into the fabric to interconnect therewith, said one of the synthetic resin plates having a plurality of projections integrally formed with the resin plates and extending outwardly from an outer surface of the resin plate to mount and connect the air bag to a housing, said synthetic resin having rigidity around the inlet port so that the edge portion of the body is easily assembled with fastening means of the air bag and is not disengaged from the fastening means when force is applied to the fastening means from the air bag; and a reinforcing metal plate embedded inside one of the synthetic resin plates to strengthen the edge portion of the body.

2. A passenger's air bag according to claim 1, further comprising a stitching line formed at the edge portion of the body, said stitching line, when the synthetic resin plates are molded at the edge portion, being embedded in the synthetic resin plates to securely connect the synthetic resin plates to the edge portion of the body.

* * * * *